(12) United States Patent
Salter et al.

(10) Patent No.: US 10,815,715 B2
(45) Date of Patent: Oct. 27, 2020

(54) POWERED TAILGATE ASSEMBLY AND CORRESPONDING METHOD

(71) Applicant: Ford Global Technologies, LLC, Dearborn, MI (US)

(72) Inventors: Stuart C. Salter, White Lake, MI (US); Aaron Halonen, Brighton, MI (US); David Brian Glickman, Southfield, MI (US); Paul Kenneth Dellock, Northville, MI (US); Pietro Buttolo, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 191 days.

(21) Appl. No.: 16/021,203

(22) Filed: Jun. 28, 2018

(65) Prior Publication Data

US 2020/0002995 A1    Jan. 2, 2020

(51) Int. Cl.
*B62D 33/027* (2006.01)
*E05F 15/75* (2015.01)
*E05F 15/73* (2015.01)
*E05F 15/79* (2015.01)

(52) U.S. Cl.
CPC .......... *E05F 15/75* (2015.01); *B62D 33/0273* (2013.01); *E05F 15/73* (2015.01); *E05F 15/79* (2015.01); *E05Y 2900/544* (2013.01)

(58) Field of Classification Search
CPC ....................................................... E05F 15/75
See application file for complete search history.

(56) References Cited

U.S. PATENT DOCUMENTS

| 7,248,011 | B2 |   | 7/2007 | Schachtl et al. |   |
|---|---|---|---|---|---|
| 7,357,435 | B2 |   | 4/2008 | Robertson |   |
| 7,503,619 | B2 | * | 3/2009 | Werner ................. | B60J 1/1884 296/106 |
| 8,410,921 | B1 |   | 4/2013 | Lewis |   |
| 9,677,315 | B2 | * | 6/2017 | Fujimoto ............... | E05F 15/60 |
| 9,830,754 | B2 |   | 11/2017 | Kim |   |
| 10,132,112 | B2 | * | 11/2018 | Yu ............................ | E05F 15/75 |
| 10,443,289 | B2 | * | 10/2019 | Rrumbullaku .......... | E05F 15/71 |
| 10,570,656 | B2 | * | 2/2020 | Elie ......................... | E05F 15/75 |
| 10,605,001 | B2 | * | 3/2020 | Bartole .................... | E05F 15/43 |
| 10,626,660 | B2 | * | 4/2020 | Ikenori .................... | E05F 15/75 |

FOREIGN PATENT DOCUMENTS

| KR | 20120124665 A | 11/2012 |
|---|---|---|
| KR | 101735802 B1 | 3/2016 |

* cited by examiner

*Primary Examiner* — Catherine A Kelly
(74) *Attorney, Agent, or Firm* — David Coppiellie; Carlson, Gaskey & Olds, P.C.

(57) ABSTRACT

This disclosure relates to a motor vehicle, such as a pickup truck, including a powered tailgate assembly and a corresponding method of using the same. An exemplary motor vehicle includes a powered tailgate assembly having a tailgate moveable between a fully closed position and a fully open position. The tailgate is also moveable to a neutral loading position near the fully open position. Further, the motor vehicle includes a controller configured to identify the onset of an active loading condition when the tailgate moves from the neutral loading position toward the fully open position.

12 Claims, 4 Drawing Sheets

POWERED TAILGATE ASSEMBLY AND CORRESPONDING METHOD

TECHNICAL FIELD

This disclosure relates to a motor vehicle, such as a pickup truck, including a powered tailgate assembly and a corresponding method of using the same.

BACKGROUND

Pickup trucks typically include a latching tailgate that swings between an upright, closed position and a horizontal, open position. When in the closed position, the tailgate is latched to a cargo box. When open, on the other hand, the tailgate provides access to the cargo box.

Commonly, tailgates are manually opened and closed by a user. For example, a handle on the tailgate can be pulled to unlatch the tailgate from the cargo box, permitting movement of the tailgate to the open position. Some tailgates also include a powered latch, which unlatches the tailgate from the closed position when a user depresses a button on a remote control or on the exterior of the tailgate, as examples. Some other pickup trucks may include powered tailgate assemblies (or simply, "powered tailgates"), which include tailgates moved between the open and closed positions by one or more automated mechanisms. Powered tailgate assemblies are often provided as an aftermarket accessory.

SUMMARY

A motor vehicle according to an exemplary aspect of the present disclosure includes, among other things, a powered tailgate assembly including a tailgate moveable between a fully closed position and a fully open position. The tailgate is also moveable to a neutral loading position near the fully open position. The vehicle further includes a controller configured to identify the onset of an active loading condition when the tailgate moves from the neutral loading position toward the fully open position.

In a further non-limiting embodiment of the foregoing vehicle, the powered tailgate assembly includes an actuator configured to move the tailgate, and the actuator is electrically coupled to the controller and is responsive to commands from the controller.

In a further non-limiting embodiment of any of the foregoing vehicles, the actuator includes a motor.

In a further non-limiting embodiment of any of the foregoing vehicles, after a period of time following the onset of the active loading condition, the controller is configured to command the actuator to move the tailgate back to the neutral loading position.

In a further non-limiting embodiment of any of the foregoing vehicles, as the actuator attempts to move the tailgate back to the neutral loading position, the controller determines whether a current level of the actuator is above a threshold.

In a further non-limiting embodiment of any of the foregoing vehicles, the period of time is a predefined period of time.

In a further non-limiting embodiment of any of the foregoing vehicles, the period of time is one minute.

In a further non-limiting embodiment of any of the foregoing vehicles, when the controller determines that vehicle operation is imminent, the controller is configured to command the actuator to move the tailgate to the fully closed position.

In a further non-limiting embodiment of any of the foregoing vehicles, the controller determines that vehicle operation is imminent during at least one of a user entering a cab of the motor vehicle and the motor vehicle being shifted into a gear other than park.

In a further non-limiting embodiment of any of the foregoing vehicles, after a period of time during which the tailgate has remained in the neutral loading position, the controller is configured to command the actuator to move the tailgate to the fully closed position.

In a further non-limiting embodiment of any of the foregoing vehicles, the controller only commands the tailgate to move to the fully closed position if a user locating device is outside of range of the vehicle.

In a further non-limiting embodiment of any of the foregoing vehicles, the controller commands the tailgate to move from the closed position to the neutral loading position when the user locating device moves back within range of the vehicle.

In a further non-limiting embodiment of any of the foregoing vehicles, the tailgate is rotatable relative to a cargo box about a hinge adjacent a bottom of the tailgate.

In a further non-limiting embodiment of any of the foregoing vehicles, the controller is configured to detect manual movement of the tailgate from the neutral loading position to an initial raise position, and the controller is configured to command an actuator to move the tailgate to the fully closed position when the tailgate is manually moved from the neutral loading position to the initial raise position.

In a further non-limiting embodiment of any of the foregoing vehicles, the vehicle includes a sensor configured to generate signals indicative of a position of the tailgate, and the controller is configured to interpret signals from the sensor in order to determine a position of the tailgate.

In a further non-limiting embodiment of any of the foregoing vehicles, the sensor is an absolute position sensor.

In a further non-limiting embodiment of any of the foregoing vehicles, the sensor is an ultrasonic sensor.

A method according to an exemplary aspect of the present disclosure includes, among other things, detecting an onset of an active loading condition when a tailgate of a powered tailgate assembly manually moves from a neutral loading position toward a fully open position.

In a further non-limiting embodiment of the foregoing method, the method includes attempting to move tailgate back to the neutral loading position after a period of time following the onset of the active loading condition, and, while attempting to move the tailgate back to the neutral loading position, determining whether a current level of an actuator is above a threshold.

In a further non-limiting embodiment of any of the foregoing methods, the method includes moving the tailgate from the neutral loading position to a fully closed position when a condition occurs indicating that vehicle operation is imminent or after a period of time during which the tailgate has remained in the neutral loading position.

DETAILED DESCRIPTION

This disclosure relates to a motor vehicle, such as a pickup truck, including a powered tailgate assembly and a corresponding method of using the same. An exemplary motor vehicle includes a powered tailgate assembly having a tailgate moveable between a fully closed position and a fully open position. The tailgate is also moveable to a neutral loading position near the fully open position. Further, the motor vehicle includes a controller configured to identify the onset of an active loading condition when the tailgate moves from the neutral loading position toward the fully open position.

By monitoring for and identifying the onset of an active loading condition, this disclosure intelligently manages automatic tailgate movements. In particular, monitoring and identifying the active loading condition allows this disclosure to strike a balance between protecting goods stored within the vehicle without interfering with a user actively loading or unloading the vehicle. These and other benefits will be appreciated from the below.

Figure 1:
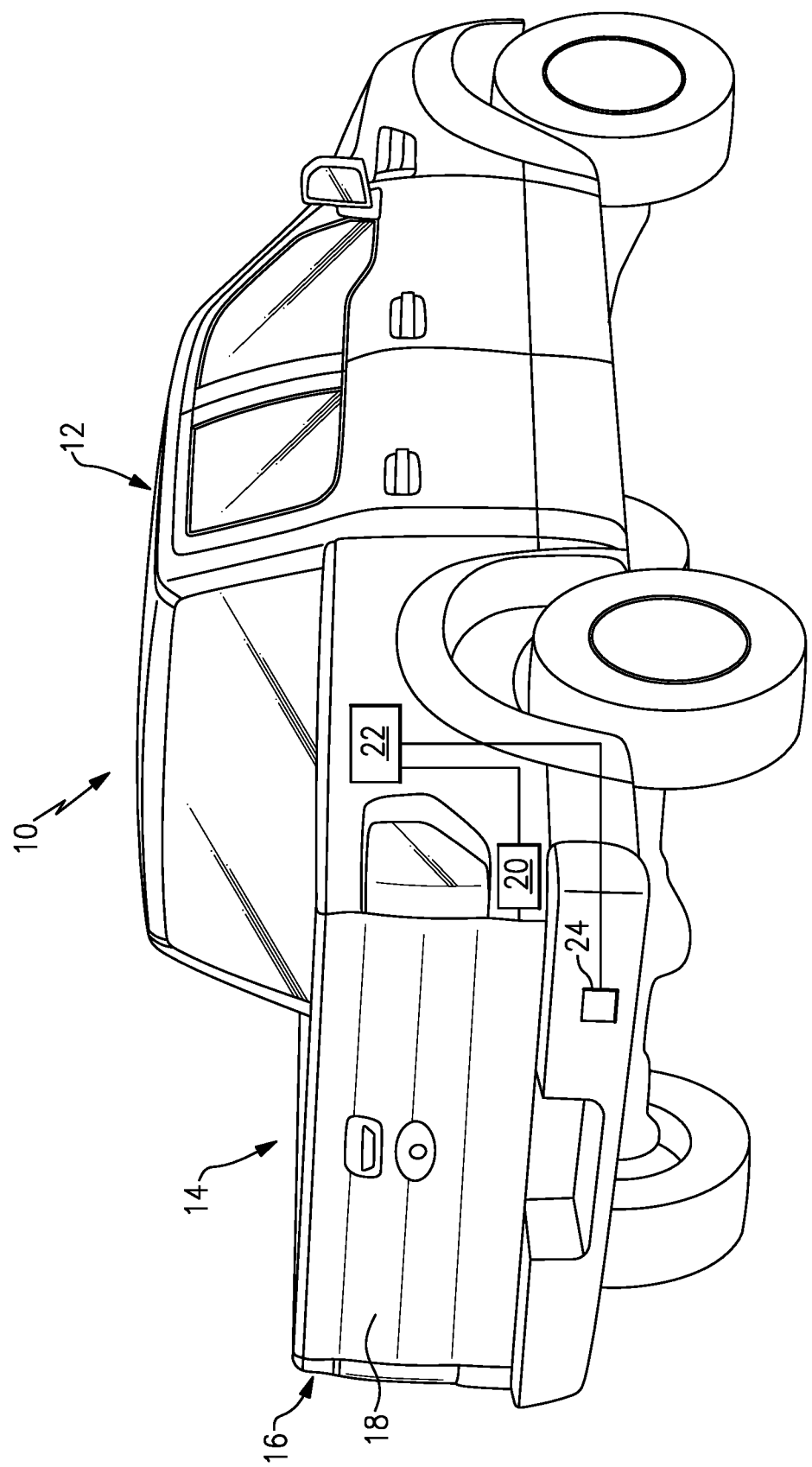
FIG. 1 is a rear-perspective view of a motor vehicle, which in this example is a pickup truck, with a tailgate in a fully closed position.

FIG. 1 illustrates a motor vehicle 10 ("vehicle 10"), which in this example is a pickup truck. The vehicle 10 includes a passenger cabin 12 and a cargo box 14. The vehicle 10 further includes a powered tailgate assembly 16, which includes a tailgate 18 rotatable about a hinge adjacent a bottom thereof. While reference is made herein to a "powered tailgate assembly" and a "tailgate," certain aspects of this disclosure may apply to a powered liftgate assembly. Further, this disclosure is not limited to pickup trucks, and extends to other types of vehicles that may include a powered tailgate or liftgate assembly.

Figure 2:
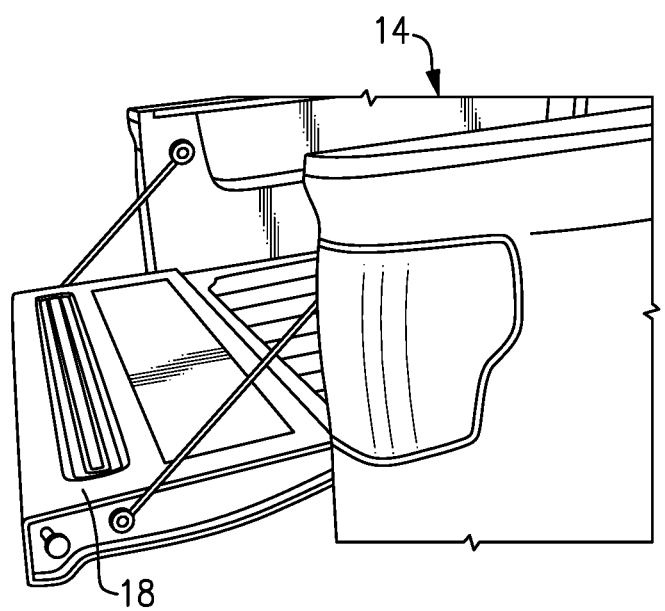
FIG. 2 is a rear-perspective view of the pickup truck of FIG. 1 with the tailgate in a fully open position.

The tailgate 18 is configured to move between a fully closed position (FIG. 1) and a fully open position (FIG. 2). The powered tailgate assembly 16 further includes an actuator 20 mechanically coupled to the tailgate 18 by one or more mechanisms, including a motor and one or more linkages. The actuator 20 is shown schematically in FIG. 1. It should be understood that the actuator 20 is configured to rotate the tailgate 18 throughout a range of positions between the fully closed and fully open positions.

The actuator 20 is electrically coupled to a controller 22, and is responsive to instructions, or commands, from the controller 22. The powered tailgate assembly 16 may also include one or more sensors 24 that provide information to the controller 22. In one example, the sensor 24 is an angular position sensor configured to generate signals indicative of an absolute angular position of the tailgate 18. In another example, the sensor 24 is configured to detect the presence of an object or a user adjacent the tailgate 18. The sensor 24 may be an ultrasonic sensor, in one example. The sensor 24 could be provided by sensors that already exist on the vehicle 10, such as cameras. Alternatively, the powered tailgate assembly 16 could include its own dedicated sensors. While the sensor 24 is shown schematically in FIG. 1, and it should be understood that this disclosure is not limited to any particular sensor type.

The controller 22 is also shown schematically in FIG. 1. It should be understood that the controller 22 could be part of an overall vehicle control module, such as a vehicle system controller (VSC), or could alternatively be a stand-alone controller separate from the VSC. Further, the controller 22 may be programmed with executable instructions for interfacing with and operating the various components of the vehicle 10. The controller 22 additionally includes a combination of hardware and software, and further includes a processing unit and non-transitory memory for executing the various control strategies and modes of the vehicle system.

While FIGS. 1 and 2 illustrate the tailgate 18 in fully closed and fully open positions, respectively, the tailgate 18 is moveable to a plurality of positions between the fully closed and fully open positions. Specifically, the actuator 20, in response to instructions from the controller 22, is configured to rotate the tailgate 18 to a plurality of intermediate positions between the fully closed and fully open positions. The controller 22 is also configured to monitor conditions of the tailgate 18 in those positions in order to manage movement of the tailgate 18 such that it prevents theft and protects goods within the cargo box 14 while avoiding any interference with a user that may be actively loading or unloading goods.

Figure 3:
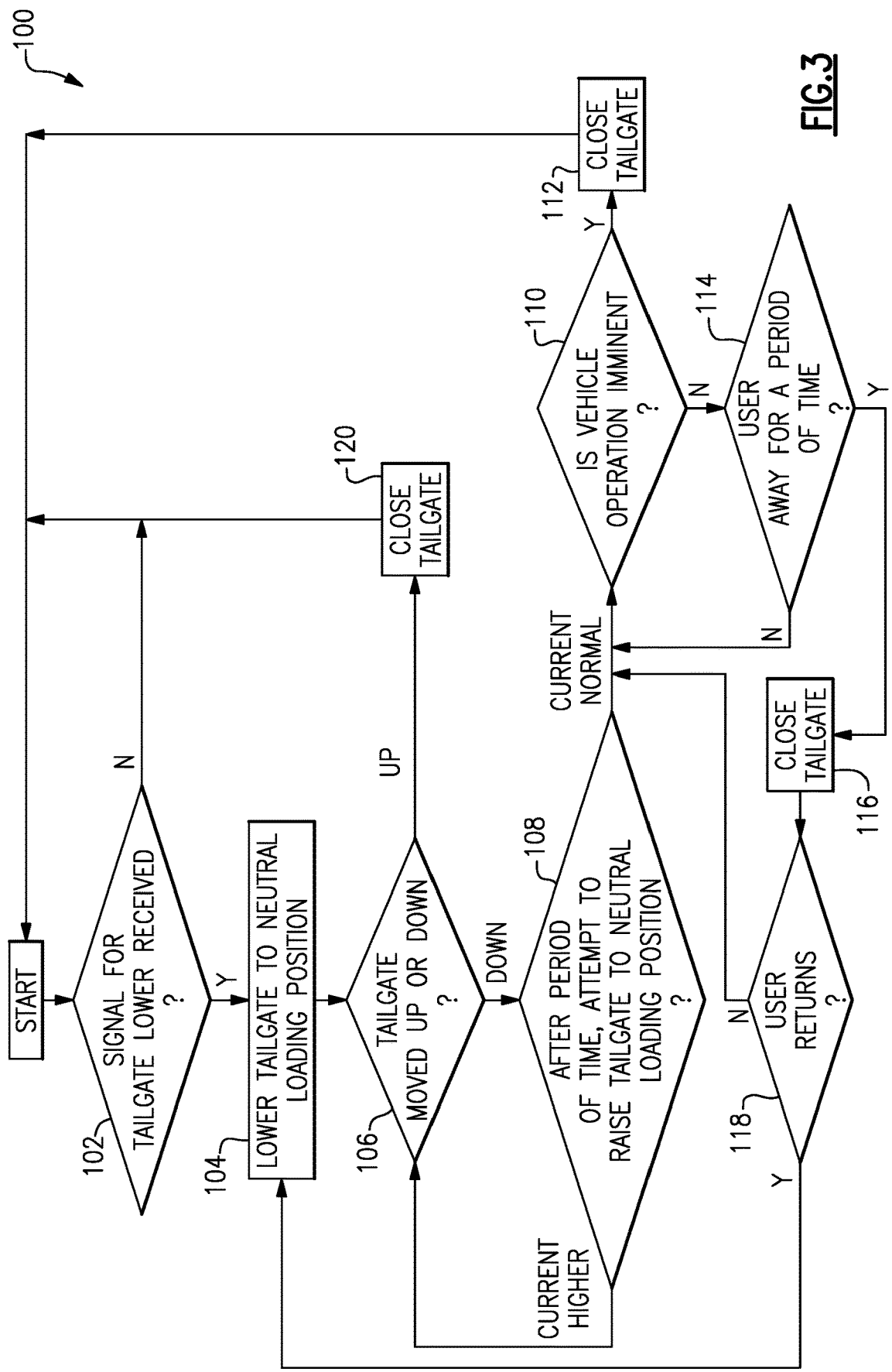
FIG. 3 is a flow chart representative of an example method.

FIG. 3 is a flow chart representative of one example method 100 of use of this disclosure. In the method 100, the controller 22 monitors for conditions that indicate the onset of an active loading condition, during which the controller 22 determines that a user is loading or unloading goods from the cargo box 14, for example. To this end, the term "active loading condition" is inclusive of unloading. When an active loading condition is identified, the controller 22 may issue certain instructions to the powered tailgate assembly 16 in order to make the powered tailgate assembly 16 more user friendly. The method 100 includes an example method for identifying an active loading condition and describes certain actions that may be taken in response to identification of the same.

The method 100 begins at 102 when a signal to lower the tailgate 18 is received. The tailgate 18 may be lowered in response to a signal from a button located within the vehicle 10 or on a user's key fob or smart phone, as examples. This disclosure is not limited to any particular signal source.

In response to the signal received in step 102, the controller 22 instructs the actuator 20 to rotate the tailgate 18 from the fully closed position to a neutral loading position, at 104. The neutral loading position is a position between the fully closed and fully open positions. In one particular example, the neutral loading position is a position near the fully open position.

Figure 4A:
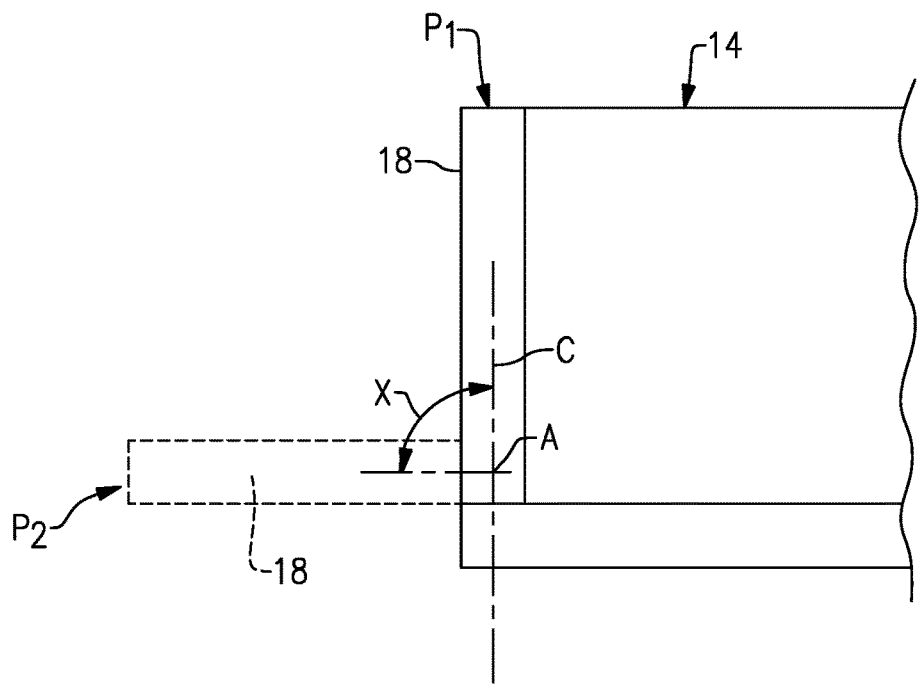
FIG. 4A is a schematic illustration representing movement of a tailgate from a fully closed position to a neutral loading position.

FIG. 4A schematically illustrates the tailgate 18 relative to the cargo box 14. In FIG. 4A the tailgate 18 is in the fully closed position $P_1$. In the fully closed position $P_1$, the tailgate 18 lies in a substantially vertical plane C. In response to the signal from step 102, the actuator 20 rotates the tailgate 18 about a hinge axis A, adjacent a bottom of the tailgate 18, to the neutral loading position $P_2$. The neutral loading position $P_2$ is illustrated in phantom in FIG. 4A.

The tailgate 18 moves through an angle X between the fully closed and neutral loading positions. In one example, the angle X is 95% of the rotation that would have been required to move the tailgate 18 from the fully closed position to the fully open position, which may be an angle of 90°. Thus, in the neutral loading position, the tailgate 18 is near the fully open position, and in one example the angle X is 85.5°. In some examples, a user may not even be able to perceive the fact that the tailgate 18 is in a position other than the fully open position. In another example, the fully open position is greater than 90° and the neutral loading position is about 90°. This disclosure is not limited to any particular values for the angles of the fully closed, fully open, or neutral loading positions.

The term "near," as in the intermediate loading position is "near" the fully open position, should be interpreted as one skilled in the art would interpret the term. The term "near" does not refer to any particular position of the tailgate 18, and is not limited to an angle X that is a particular percentage of the full range of motion of the tailgate 18.

With the tailgate 18 lowered to the neutral loading position $P_2$, as schematically represented in FIG. 4A, the actuator 20 is instructed to hold the tailgate in the neutral loading position $P_2$. In this position, a user may begin loading and/or unloading goods from the cargo box 14. Alternatively or in addition, the user may sit on the tailgate 18 or place an object on the tailgate 18. Such applications of force may cause the tailgate 18 to rotate downward, which is represented in the schematic illustration of FIG. 4B.

Figure 4B:
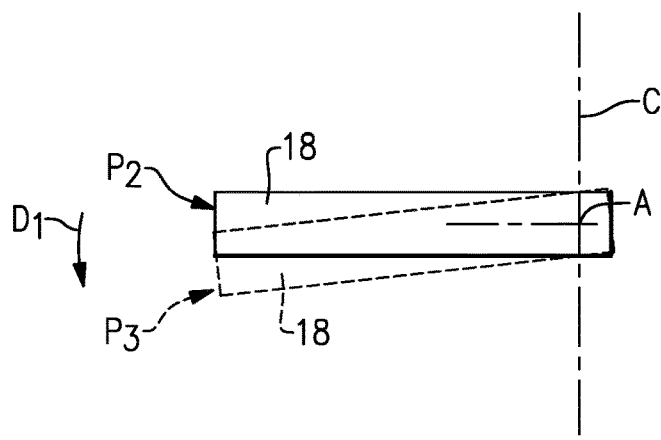
FIG. 4B is a schematic illustration representing the tailgate in the neutral loading position and a corresponding downward movement of the tailgate.

In particular, in FIG. 4B, an application of force has caused the tailgate 18 to rotate downward in the direction $D_1$, which is a counter-clockwise direction. The application of force causes the actuator 20 to move (i.e., freewheel), and the controller 22 is configured to interpret that movement as manual downward movement of the tailgate 18. The term "manual" is used to distinguish automated movements intentionally caused by the actuator 20 and the controller 22. The controller 22 may also attempt to identify, or confirm, such movement using information from the sensor 24.

Regardless, at 106, the controller 22 interprets downward movement of the tailgate 18 as the onset of an active loading condition. In particular, the controller 22 interprets movement from the neutral loading position $P_2$ toward the fully open position $P_3$ as the onset of an active loading condition.

In one example, the controller 22 only identifies the onset of the active loading condition when the tailgate 18 is rotated to the fully open position $P_3$. In other words, the force applied to the tailgate 18 must be sufficient to cause rotation of the tailgate 18 to the fully open position $P_3$, and light, incidental contact will not case the controller 22 to identify an onset of an active loading condition, for example. In another example, the controller 22 identifies the onset of the active loading condition if there is a certain, predetermined level of downward movement (i.e., rotation of 2°) of the tailgate 18 from the neutral loading position. In yet another example, any downward movement of the tailgate 18 will be interpreted as the onset of an active loading condition.

After the onset of an active loading condition is detected, the controller 22 attempts to determine whether loading activities are continuing, and then instructs the actuator 20 accordingly. In one particular example, at 108, the controller 22 is configured to command the actuator 20 to move the tailgate 18 back to the neutral loading position after a period of time. The period of time may be 1 minute, in one example, although this disclosure is not limited to any particular period of time.

If a user is still loading/unloading the cargo box 14 or sitting on the tailgate 18, as examples, the current required of the actuator 20 to rotate the tailgate 18 to the neutral loading position will be above a normal level. The controller 22 is configured to interpret the level of current associated with the actuator 20, and, if the current level is higher than a normal level, the controller 22 determines that a loading/unloading event is still ongoing. In that case, the method returns to step 106 until the current level returns to the normal level. In this way, the controller 22 continually tracks and monitors the active loading condition.

The controller 22 interprets the return of the current level to a normal level as a break, slowing, or end of an active loading condition. As such, the controller 22 now attempts to identify conditions which justify closure of the tailgate 18. At step 110, for example, the controller 22 identifies conditions that correspond with imminent operation of the vehicle. If such conditions are identified, the controller 22 instructs the actuator 20 to raise the tailgate 18 to the fully closed position, at 112. Such conditions indicative of imminent vehicle operation include identifying that a user has entered a cab of the vehicle 10 or identifying that the vehicle 10 has been shifted into a gear other than park (i.e., drive, reverse). This disclosure is not limited to these conditions, however, and extends to other conditions indicative of imminent vehicle operation. In this way, the controller 22 protects any goods that may be in the cargo box 14, and prevents the user from unintentionally leaving the tailgate 18 during driving. The controller 22 may also send a message to the user via a push notification or displaying a message in a vehicle infotainment system indicating that the tailgate 18 is being automatically closed.

In another aspect of the method 100, the controller 22 attempts to strike a balance between preventing theft of goods within the cargo box 14 and allowing the user to freely load and unload the cargo box 14. For instance, despite vehicle operation not being imminent, the controller 22 determines whether a user is away from the vehicle 10 for a period of time, at 114. The controller 22 may make this determination by detecting, using sensor 24 or another sensor, the presence of a user locating device, such as a key fob or mobile device, within a certain range of the vehicle 10. If the user locating device is outside the range for a period of time, the controller 22 instructs the actuator 20 to raise the tailgate 18 to the fully closed position, at 116. The period of time may be 10 minutes in one example, although this disclosure is not limited to any particular period of time. In this way, the controller 22 protects the goods within the cargo box 14 and prevents theft while the user is away.

Since the user may not have desired to stop loading/unloading the cargo box 14 altogether, despite being away from the vehicle 10 for a period of time, the controller 22 monitors for the return of the user locating device, at 118, and returns the tailgate to the neutral loading position (i.e., the controller 22 performs step 104) when the user returns. Thus, if desired, the user may continue loading when returning the vehicle 10. This particular aspect of the disclosure (i.e., steps 114, 116, and 118) may be applied outside the context of pickup trucks, and extends to vehicles, such as sport utility vehicles (SUVs), that include liftgates.

Returning to step 106, not only does the controller 22 monitor for manual downward movement of the tailgate 18, but the controller 22 also monitors for manual upward movement $D_2$ (i.e., clockwise movement, relative to FIG. 4C) of the tailgate 18. If manual upward movement is detected, either by movement of the actuator 20, by the sensor 24, or both, the controller 22 is interprets such movement as a desire of the user to fully raise the tailgate 18, and thus the controller 22 instructs the actuator 20 to raise the tailgate 18 to the fully closed position, at 120.

Figure 4C:
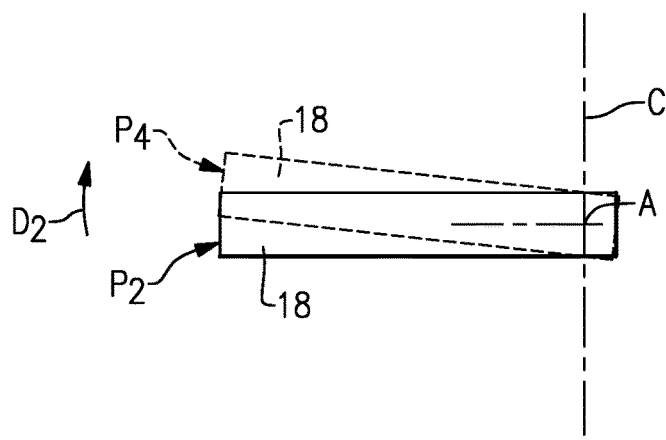
FIG. 4C is a schematic illustration representing the tailgate in the neutral loading position and a corresponding upward movement of the tailgate.

In particular, with reference to FIG. 4C, the tailgate 18 is manually moved by a user in the direction $D_2$ from the neutral loading position $P_2$ to an initial raise position $P_4$. The initial raise position $P_4$ may be a predetermined angle from the neutral loading position $P_2$. The initial raise position $P_4$, in a particular example, is 90% of the fully open position. In the example where the fully open position is 90° from the fully closed position, the neutral loading position may be 85.5° and the initial raise position may be 81°. Again, this disclosure is not limited to these particular values. In another example, the controller 22 considers any upward movement of the tailgate 18 to be an initial raise position.

It should be understood that terms such as "about," "substantially," and "generally" are not intended to be boundaryless terms, and should be interpreted consistent with the way one skilled in the art would interpret those terms. Further, directional terms such as "top," "bottom," "side," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
   a powered tailgate assembly including a tailgate moveable between a fully closed position and a fully open position, wherein the tailgate is moveable to a neutral loading position near the fully open position;
   a controller configured to identify the onset of an active loading condition when the tailgate moves from the neutral loading position toward the fully open position,
   wherein the powered tailgate assembly includes an actuator configured to move the tailgate,
   wherein the actuator is electrically coupled to the controller and is responsive to commands from the controller,
   wherein, after a period of time following the onset of the active loading condition, the controller is configured to command the actuator to move the tailgate back to the neutral loading position,
   wherein, as the actuator attempts to move the tailgate back to the neutral loading position, the controller determines whether a current level of the actuator is above a threshold,
   wherein, when the controller determines that vehicle operation is imminent, the controller is configured to command the actuator to move the tailgate to the fully closed position, and
   wherein the controller determines that vehicle operation is imminent during at least one of a user entering a cab of the motor vehicle and the motor vehicle being shifted into a gear other than park.

2. The motor vehicle as recited in claim 1, wherein the actuator includes a motor.

3. The motor vehicle as recited in claim 1, wherein the period of time is a predefined period of time.

4. The motor vehicle as recited in claim 1, wherein the period of time is one minute.

5. The motor vehicle as recited in claim 1, wherein, after a period of time during which the tailgate has remained in the neutral loading position, the controller is configured to command the actuator to move the tailgate to the fully closed position.

6. A motor vehicle, comprising:
   a powered tailgate assembly including a tailgate moveable between a fully closed position and a fully open position, wherein the tailgate is moveable to a neutral loading position near the fully open position;
   a controller configured to identify the onset of an active loading condition when the tailgate moves from the neutral loading position toward the fully open position,
   wherein the powered tailgate assembly includes an actuator configured to move the tailgate,
   wherein the actuator is electrically coupled to the controller and is responsive to commands from the controller,
   wherein, after a period of time following the onset of the active loading condition, the controller is configured to command the actuator to move the tailgate back to the neutral loading position,
   wherein, as the actuator attempts to move the tailgate back to the neutral loading position, the controller determines whether a current level of the actuator is above a threshold,
   wherein, after a period of time during which the tailgate has remained in the neutral loading position, the controller is configured to command the actuator to move the tailgate to the fully closed position, and
   wherein the controller only commands the tailgate to move to the fully closed position if a user locating device is outside of range of the vehicle.

7. The motor vehicle as recited in claim 1, wherein:
   the controller is configured to detect manual movement of the tailgate from the neutral loading position to an initial raise position, and
   the controller is configured to command the actuator to move the tailgate to the fully closed position when the tailgate is manually moved from the neutral loading position to the initial raise position.

8. The motor vehicle as recited in claim 1, further comprising:
   a sensor configured to generate signals indicative of a position of the tailgate, the controller configured to interpret signals from the sensor in order to determine a position of the tailgate.

9. The motor vehicle as recited in claim 8, wherein the sensor is an absolute position sensor.

10. The motor vehicle as recited in claim 9, wherein the sensor is an ultrasonic sensor.

11. The motor vehicle as recited in claim 1, wherein the controller determines the active loading condition is still ongoing if the current level of the actuator is above the threshold.

12. The motor vehicle as recited in claim 6, wherein the controller commands the tailgate to move from the closed position to the neutral loading position when the user locating device moves back within range of the vehicle.

* * * * *